US012671610B2

(12) United States Patent (10) Patent No.: US 12,671,610 B2
Jain et al. (45) Date of Patent: Jun. 30, 2026

(54) ALIASING REMOVAL FOR WIRELESS CHANNEL CAPTURES

(71) Applicant: QUALCOMM Incorporated, San Diego, CA (US)

(72) Inventors: Akansh Jain, Chennai (IN); G Sriram, Karaikudi (IN); Xiaoxin Zhang, Sunnyvale, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/627,894

(22) Filed: Apr. 5, 2024

(65) Prior Publication Data

US 2025/0317327 A1 Oct. 9, 2025

(51) Int. Cl.
*H04L 25/02* (2006.01)
*H04W 84/12* (2009.01)

(52) U.S. Cl.
CPC ........ *H04L 25/022* (2013.01); *H04L 25/0212* (2013.01); *H04W 84/12* (2013.01)

(58) Field of Classification Search
CPC .......................... H04L 25/022; H04L 25/0212
See application file for complete search history.

(56) References Cited

U.S. PATENT DOCUMENTS

| | | | |
|---|---|---|---|
| 8,831,121 B1 * | 9/2014 | Qi ....................... | H04L 27/2653 |
| | | | 375/260 |
| 10,180,515 B2 * | 1/2019 | Ellmauthaler ........ | E21B 47/135 |
| 2009/0122319 A1 * | 5/2009 | Ronnekleiv ........... | G01H 9/004 |
| | | | 356/477 |
| 2020/0295912 A1 * | 9/2020 | Venkatraman ......... | H04L 5/143 |

* cited by examiner

*Primary Examiner* — Erika A Washington

(74) *Attorney, Agent, or Firm* — Muncy, Geissler, Olds & Lowe, P.C.

(57) ABSTRACT

Disclosed are techniques for aliasing removal for wireless channel captures. In an aspect, a wireless station (STA) may estimate a wireless channel to produce a first frequency domain (FD) channel estimate. The STA may anti-alias the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread. The STA may tone-decimate the second FD channel estimate to produce a third FD channel estimate. The STA may store the third FD channel estimate as a channel capture. In some aspects, the STA may send the channel capture to another entity as channel capture feedback, may performing a sensing operation using the channel capture, or both.

20 Claims, 11 Drawing Sheets

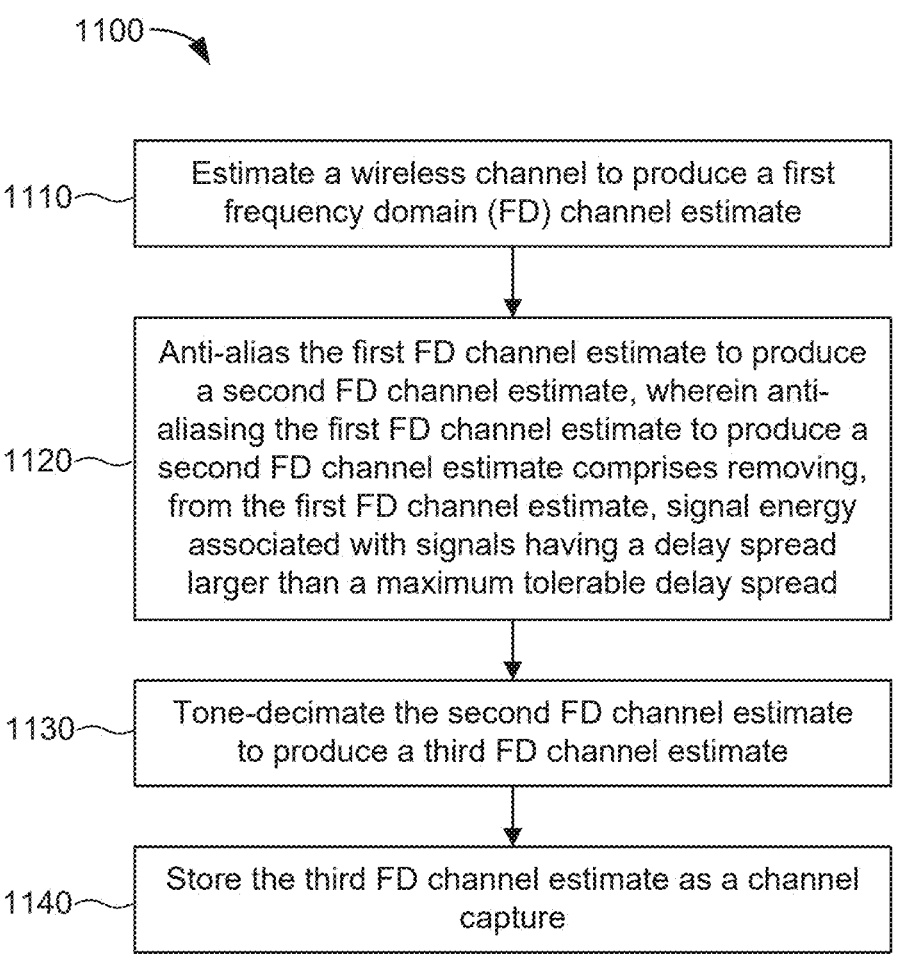

1100

1110 — Estimate a wireless channel to produce a first frequency domain (FD) channel estimate 1120 — Anti-alias the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread 1130 — Tone-decimate the second FD channel estimate to produce a third FD channel estimate 1140 — Store the third FD channel estimate as a channel capture

*FIG. 11*

ALIASING REMOVAL FOR WIRELESS CHANNEL CAPTURES

BACKGROUND OF THE DISCLOSURE

1. Field of the Disclosure

Aspects of the disclosure relate generally to wireless local area network (WLAN) sensing, also known as Wi-Fi sensing. More specifically, aspects of the disclosure relate to techniques for removing aliasing artifacts that may be present due to tone decimation for channel captures.

2. Description of the Related Art

Wireless local area network (WLAN) sensing, also known as Wi-Fi sensing, is a technology that uses Wi-Fi signals to perform sensing tasks, by exploiting prevalent Wi-Fi infrastructures and ubiquitous Wi-Fi signals over surrounding environments. In particular, Wi-Fi radio waves can bounce, penetrate, and bend on the surface of objects during their propagation. By proper signal processing, the received Wi-Fi signals can be harnessed to sense surrounding environments, detect obstructions, and interpret target movement. Under certain conditions, however, processing of the received Wi-Fi signals can result in aliasing artifacts, which can cause an erroneous estimated arrival time of the signal being used for sensing, for example, which can then cause errors in the time of arrival (TOA) and/or angle of arrival (AOA) calculations that are part of the sensing and measurement process. As a result, the sensing measurements may be inaccurate. Thus, there is a need for techniques to avoid or mitigate aliasing artifacts that may occur during WLAN sensing.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless sensing includes estimating a wireless channel to produce a first frequency domain (FD) channel estimate; anti-aliasing the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread; tone-decimating the second FD channel estimate to produce a third FD channel estimate; and storing the third FD channel estimate as a channel capture.

In an aspect, a wireless station (STA) includes one or more memories; one or more transceivers; and one or more processors communicatively coupled to the one or more memories and the one or more transceivers, the one or more processors, either alone or in combination, configured to: estimate a wireless channel to produce a first frequency domain (FD) channel estimate; anti-alias the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread; tone-decimate the second FD channel estimate to produce a third FD channel estimate; and store the third FD channel estimate as a channel capture.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 11 is a flowchart of an example process associated with aliasing removal for 802.11bf channel captures, according to aspects of the disclosure.

DETAILED DESCRIPTION

Figure 1:
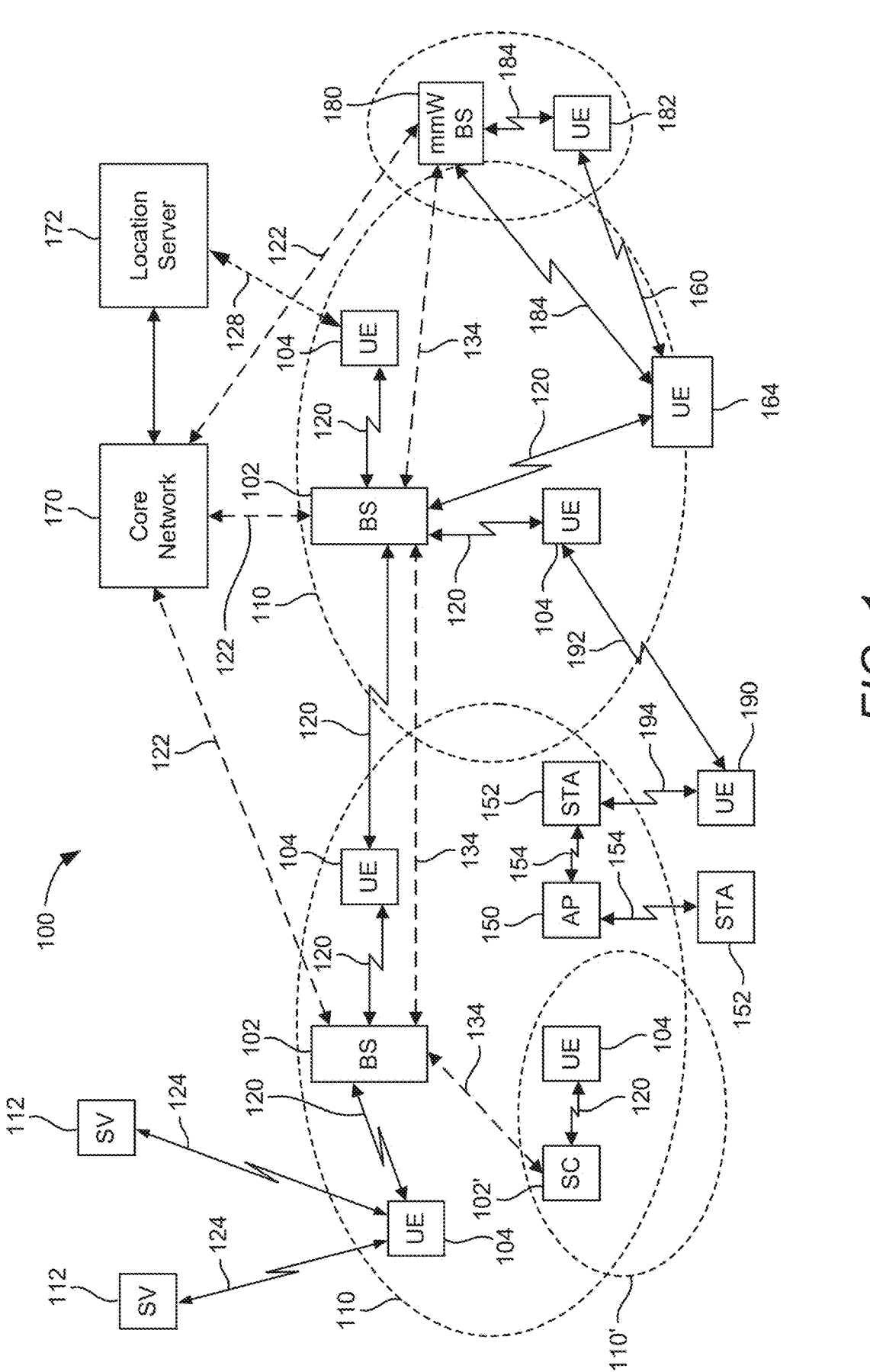
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to techniques to improve the accuracy of wireless local area network (WLAN) sensing, also known as Wi-Fi sensing, especially for centimeter-level resolution. Some aspects more specifically relate to techniques avoiding aliasing artifacts that may occur as a result of tone-decimation of signals having large delay spreads. Such artifacts can cause erroneous results in sensing operations.

Disclosed are techniques for aliasing removal for wireless channel captures. In an aspect, a wireless station (STA) may estimate a wireless channel to produce a first frequency domain (FD) channel estimate. The STA may anti-alias the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread. The STA may tone-decimate the second FD channel estimate to produce a third FD channel estimate. The STA may store the third FD channel estimate as a channel capture. In some aspects, the STA may send the channel capture to another entity as channel capture feedback, may performing a sensing operation using the channel capture, or both.

Particular aspects of the subject matter described in this disclosure can be implemented to realize one or more of the following potential advantages. In some examples, removal of aliasing artifacts can improve sensing accuracy, especially for centimeter-level resolution. The techniques disclosed herein enable chipsets to provide accurate channel estimation for up to the maximum delay spread supported in larger delay spread channels with larger tone-decimation ratios, which are preferred because larger tone-decimation ratios mean less data to transfer as part of channel capture. As will be explained in more detail below, the techniques presented herein enable the use of a subcarrier grouping factor of 16 for sensing measurement reports (SMRs) in IEEE 802.11bf-compatible equipment in the presence of channels with a large delay spread.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Wireless local area network (WLAN) sensing, also known as Wi-Fi sensing, is a technology that uses Wi-Fi signals to perform sensing tasks, by exploiting prevalent Wi-Fi infrastructures and ubiquitous Wi-Fi signals over surrounding environments. In particular, Wi-Fi radio waves can bounce, penetrate, and bend on the surface of objects during their propagation. By proper signal processing, the received Wi-Fi signals can be harnessed to sense surrounding environments, detect obstructions, and interpret target movement. Under certain conditions, however, processing of the received Wi-Fi signals can result in aliasing artifacts, which can cause an erroneous estimated arrival time of the signal being used for sensing, for example, which can then cause errors in the time of arrival (TOA) and/or angle of arrival (AOA) calculations that are part of the sensing and measurement process. As a result, the sensing measurements may be inaccurate.

In general, the WLAN sensing can be classified into two main categories, which are implemented based on different wireless signal characteristics, namely the received signal strength indicator (RSSI) and channel state information (CSI). Specifically, the RSSI corresponds to the measured received signal strength at the receiver. RSSI has been widely used in the early attempts of WLAN sensing, based on fingerprint and geometric model based methods. For example, RSSI patterns at different locations can be used as fingerprints for localization.

In contrast to RSSI, CSI is able to provide finer-grained wireless channel information at the physical layer, which is thus considered as an alternative solution for accurate sensing. CSI contains both channel amplitude and phase information over different subcarriers that provide the capability to discriminate multi-path characteristics. For instance, by processing the spatial-, frequency-, and time-domain CSI at multiple antennas, subcarriers, and time samples via fast Fourier transform (FFT), it is possible to extract detailed multi-path parameters such as angle-of-arrival (AOA), time-of-flight (ToF), and doppler frequency shift (DFS). CSI-based sensing approaches have been demonstrated to provide high sensing accuracy for detection and tracking. WLAN sensing can provide good coverage because radio signals can propagate through walls to provide additional non-LOS (NLOS) information. WLAN sensing can reuse existing Wi-Fi devices with significantly less cost.

The Institute of Electrical and Electronic Engineers (IEEE) has established the 802.11bf standard for WLAN sensing. According to the formal definition of IEEE 802.11bf, WLAN sensing refers to the use of wireless signals received from WLAN sensing capable stations (STAs) to determine the features (e.g., range, velocity, angular, motion, presence or proximity, gesture) of the intended targets (e.g., object, human, animal) in a given environment (e.g., room, house vehicle, enterprise). A STA is a device that contains IEEE 802.11 MAC and PHY interfaces to the wireless medium (WM). For example, an STA can be an access point (AP), a user equipment (UE), a laptop, a WLAN-enabled phone, etc. Generally, STAs can be divided into AP STAs and non-AP STAs.

IEEE 802.11bf defines a sensing procedure as one that allows a STA to perform WLAN sensing and obtain measurement results, and defines a sensing session is an agreement between a sensing initiator and a sensing responder to participate in the sensing procedure. Here, the sensing initiator and sensing responder are defined depending on which STA initiates a WLAN sensing procedure, and requests and/or obtains measurements. A sensing initiator is a STA that initiates a sensing procedure, while a sensing responder is a STA that participates in a sensing procedure initiated by a sensing initiator. Both the sensing initiator and sensing responder can be an AP or a non-AP STA. In addition, a sensing transmitter is a STA that transmits physical layer protocol data units (PPDUs) used for sensing measurements in a sensing procedure, and a sensing receiver is a STA that receives PPDUs sent by a sensing transmitter and performs sensing measurements in a sensing procedure.

FIG. 1 illustrates an example wireless communications system 100, according to aspects of the disclosure. The wireless communications system 100 (which may also be referred to as a wireless wide area network (WWAN)) may include various base stations 102 (labeled "BS") and various user equipment (UEs) 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2:
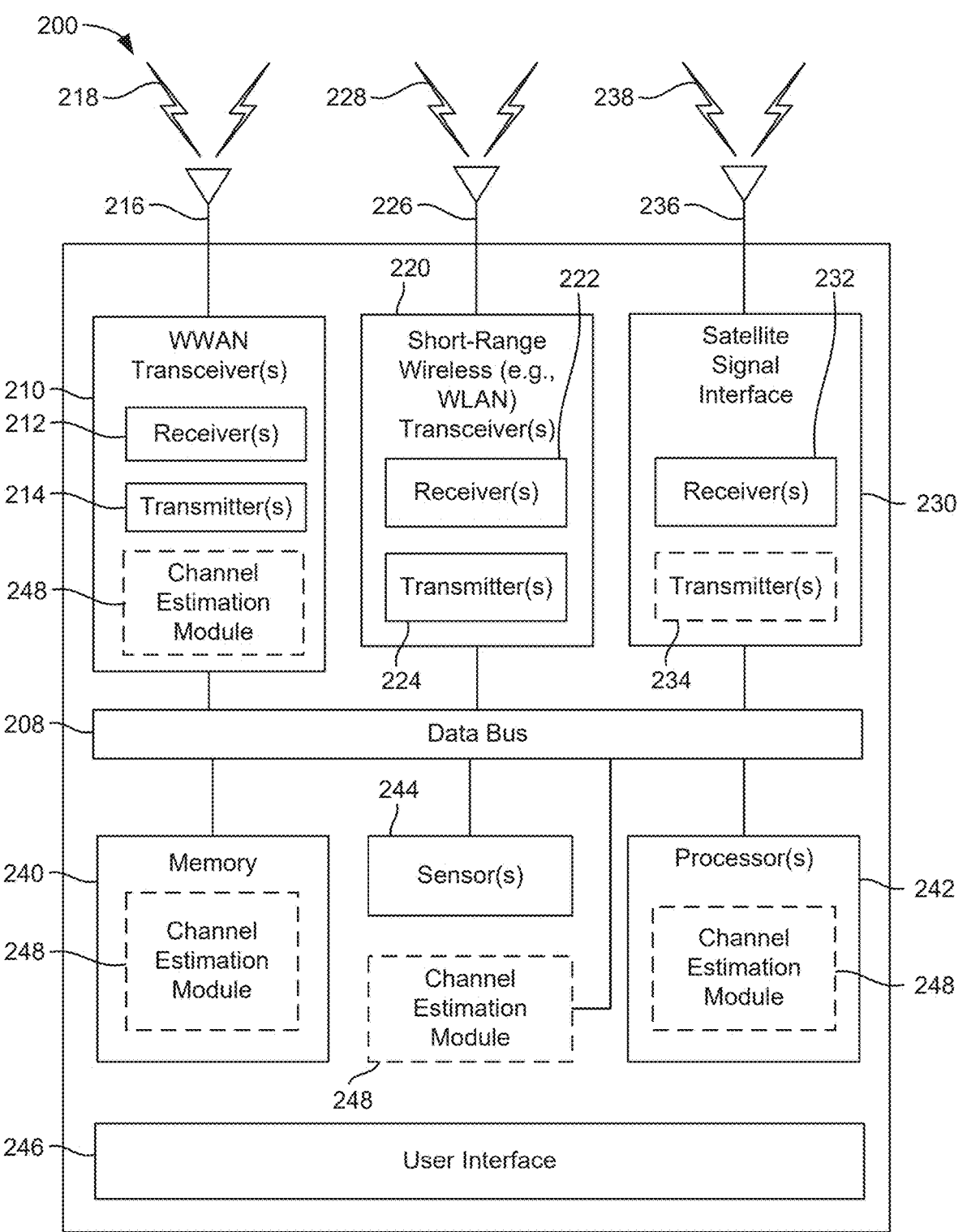
FIG. 2 illustrates an example wireless station (STA) architecture, according to various aspects of the disclosure.

FIG. 2 illustrates several example components (represented by corresponding blocks) that may be incorporated into a wireless station 200 (which may correspond to any of the UEs described herein and which may be a WLAN STA 152). It will be appreciated that these components may be implemented in different types of apparatuses in different implementations (e.g., in an application-specific integrated circuit (ASIC), in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The STA 200 includes one or more wireless wide area network (WWAN) transceivers 210 providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The one or more WWAN transceivers 210 may each be connected to one or more antennas 216 for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 210 may be variously configured for transmitting and encoding signals 218 (e.g., messages, indications, information, and so on) and, conversely, for receiving and decoding signals 218 (e.g., messages, indications, information, pilots, and so on) in accordance with the designated RAT. Specifically, the one or more WWAN transceivers 210 include one or more transmitters 214 for transmitting and encoding signals 218 and one or more receivers 212 for receiving and decoding signals 218.

The STA 200 also includes, at least in some cases, one or more short-range wireless transceivers 220. The one or more short-range wireless transceivers 220 may be connected to one or more antennas 226 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE-D, BLUETOOTH®, ZIG-BEE®, Z-WAVE®, PC5, dedicated short-range communications (DSRC), wireless access for vehicular environments (WAVE), near-field communication (NFC), ultra-wideband (UWB), etc.) over a wireless communication medium of interest. The one or more short-range wireless transceivers 220 may be variously configured for transmitting and encoding signals 228 (e.g., messages, indications, information, and so on) and, conversely, for receiving and decoding signals 228 (e.g., messages, indications, information, pilots, and so on) in accordance with the designated RAT. Specifically, the one or more short-range wireless transceivers 220 include one or more transmitters 224 for transmitting and encoding signals 228 and one or more receivers 222 for receiving and decoding signals 228. As specific examples, the one or more short-range wireless transceivers 220 may be WLAN/Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The STA 200 also includes, at least in some cases, a satellite signal interface 230, which includes one or more satellite signal receivers 232 and may optionally include one or more satellite signal transmitters 234. The one or more satellite signal receivers 232 may be connected to one or more antennas 236 and may provide means for receiving and/or measuring satellite positioning/communication signals 238. Where the one or more satellite signal receivers 232 include a satellite positioning system receiver, the satellite positioning/communication signals 238 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the one or more satellite signal receivers 232 include a non-terrestrial network (NTN) receiver, the satellite positioning/communication signals 238 may be communication signals (e.g., carrying control and/or user data) originating from a 5G network. The one or more satellite signal receivers 232 may comprise any suitable hardware and/or software for receiving and processing satellite positioning/communication signals 238. The one or more satellite signal receivers 232 may request information and operations as appropriate from the other systems, and, at least in some cases, perform calculations to determine locations of the STA 200 using measurements obtained by any suitable satellite positioning system algorithm.

The optional satellite signal transmitter(s) 234, when present, may be connected to the one or more antennas 236 and may provide means for transmitting satellite positioning/communication signals 238. Where the one or more satellite signal transmitters 234 include an NTN transmitter, the satellite positioning/communication signals 238 may be communication signals (e.g., carrying control and/or user data) originating from a 5G network. The one or more satellite signal transmitters 234 may comprise any suitable hardware and/or software for transmitting satellite positioning/communication signals 238. The one or more satellite signal transmitters 234 may request information and operations as appropriate from the other systems.

A transceiver may be configured to communicate over a wired or wireless link. A transceiver (whether a wired transceiver or a wireless transceiver) includes transmitter circuitry (e.g., transmitters 214, 224) and receiver circuitry (e.g., receivers 212, 222). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver may be coupled to one or more wired network interface ports. Wireless transmitter circuitry (e.g., transmitters 214, 224) may include or be coupled to a plurality of antennas (e.g., antennas 216, 226), such as an antenna array, that permits the respective apparatus (e.g., STA 200) to perform transmit "beamforming," as described herein. Similarly, wireless receiver circuitry (e.g., receivers 212, 222) may include or be coupled to a plurality of antennas (e.g., antennas 216, 226), such as an antenna array, that permits the respective apparatus (e.g., STA 200) to perform receive beamforming, as described herein. In an aspect, the transmitter circuitry and receiver circuitry may share the same plurality of antennas (e.g., antennas 216, 226), such that the respective apparatus can only receive or transmit at a given time, not both at the same time. A wireless transceiver (e.g., the one or more WWAN transceivers 210, the one or more short-range wireless transceivers 220) may also include a network listen module (NLM) or the like for performing various measurements.

As used herein, the various wireless transceivers (e.g., transceivers 210, 220) and wired transceivers may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a wireless station (e.g., STA 200, UE 104) and a base station will generally relate to signaling via a wireless transceiver.

The STA 200 also includes other components that may be used in conjunction with the operations as disclosed herein. The STA 200 includes one or more processors 242 for providing functionality relating to, for example, wireless communication, and for providing other processing functionality. The one or more processors 242 may therefore provide means for processing, such as means for determining, means for calculating, means for receiving, means for transmitting, means for indicating, etc. In an aspect, the one or more processors 242 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The STA 200 includes memory circuitry implementing memory 240 (e.g., each including a memory device) for maintaining information (e.g., information indicative of reserved resources, thresholds, parameters, and so on). The memory 240 may therefore provide means for storing, means for retrieving, means for maintaining, etc. In some cases, the STA 200 may include a channel estimation module 248. The channel estimation module 248 may be hardware circuits that are part of or coupled to the one or more processors 242 that, when executed, cause the STA 200 to perform the functionality described herein. In other aspects, the channel estimation module 248 may be external to the processors 242 (e.g., part of a modem processing system, integrated with another processing system, etc.). Alternatively, the channel estimation module 248 may be a memory module stored in the memory 240 that, when executed by the one or more processors 242 (or a modem processing system, another processing system, etc.), cause the STA 200 to perform the functionality described herein. FIG. 2 illustrates possible locations of the channel estimation module 248, which may be, for example, part of the one or more WWAN transceivers 210, the memory 240, the one or more processors 242, or any combination thereof, or may be a standalone component.

The STA 200 may include one or more sensors 244 coupled to the one or more processors 242 to provide means for sensing or detecting movement and/or orientation information that is independent of motion data derived from signals received by the one or more WWAN transceivers 210, the one or more short-range wireless transceivers 220, and/or the satellite signal interface 230. By way of example, the sensor(s) 244 may include one or more accelerometers (e.g., micro-electrical mechanical systems (MEMS) devices), a gyroscope, a geomagnetic sensor (e.g., a compass), an altimeter (e.g., a barometric pressure altimeter), and/or any other type of movement detection sensor. Moreover, the sensor(s) 244 may include a plurality of different types of devices and combine their outputs in order to provide motion information. For example, the sensor(s) 244 may use a combination of a multi-axis accelerometer and orientation sensors to provide the ability to compute positions in two-dimensional (2D) and/or three-dimensional (3D) coordinate systems. Note that at least the accelerometer and gyroscope may be referred to as "inertial" sensors.

The various components of the STA 200 may be communicatively coupled to each other over a data bus 208. In an aspect, the data bus 208 may form, or be part of, a communication interface of the STA 200.

In addition, the STA 200 includes a user interface 246 providing means for providing indications (e.g., audible and/or visual indications) to a user and/or for receiving user input (e.g., upon user actuation of a sensing device such a keypad, a touch screen, a microphone, and so on).

For convenience, the STA 200 is shown in FIG. 2 as including various components that may be configured according to the various examples described herein. It will be appreciated, however, that the illustrated components may have different functionality in different designs. In particular, various components in FIG. 2 are optional in alternative configurations and the various aspects include configurations that may vary due to design choice, costs, use of the device, or other considerations. For example, a particular implementation of STA 200 may omit the WWAN transceiver(s) 210 (e.g., a wearable device or tablet computer or PC or laptop may have Wi-Fi and/or BLUETOOTH® capability without cellular capability), or may omit the short-range wireless transceiver(s) 220 (e.g., cellular-only, etc.), or may omit the satellite signal interface 230, or may omit the sensor(s) 244, and so on. For brevity, illustration of the various alternative configurations is not provided herein, but would be readily understandable to one skilled in the art.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 210 to 246 may be implemented by processor and memory component(s) of the STA 200 (e.g., by execution of appropriate code and/or by appropriate configuration of processor components). For simplicity, various operations, acts, and/or functions are described herein as being performed "by a UE" or "by a STA." However, as will be appreciated, such operations, acts, and/or functions may actually be performed by specific components or combinations of components of the STA 200, such as the one or more processors 242, the one or more transceivers 210 and 220, the memory 240, the channel estimation module 248, etc.

As used herein, the term "channel estimation" refers to the process of estimating properties of a channel, i.e., creating a channel estimate, based on a received signal. This typically involves transmitting a signal known to both sender and receiver over the wireless channel. The signal received by the receiver may include distortion and/or noise caused by channel conditions, but by comparing the received signal to the known, expected signal, the properties of the channel may be determined. In wireless local area network (WLAN) systems, a wireless frame may include a long training field (LTF). Because the LTF is known to both sender and receiver, the LTF is a good candidate for channel estimation. In a typical use case, the channel estimate will be used by the transceiver hardware and then discarded. In other use cases, however, the channel estimate is not discarded.

As used herein, the term "channel capture" refers to the process of storing the channel estimate for some later purpose, and may involve sending the channel estimate to a higher layer. In some standards documents, the term "channel capture" may also be used to refer to the stored channel estimate itself, i.e., the result of the channel capture operation.

As used herein, the term "channel frequency response (CFR)" refers to the wireless characteristics of the signal propagation between the transmitter and the receiver at certain carrier frequencies. CFR specifically refers to the response in the frequency domain. CFR may be estimated as part of channel estimation process in any wireless receiver.

As used herein, the term "channel impulse response (CIR)" describes the multipath propagation delay versus the received signal power for each channel. CIR may be derived by performing an inverse fast Fourier transform (IFFT) on the CFR in the frequency domain. The CIR may be expressed as a set of complex values. Since the maximum range of WLAN sensing is a few dozen meters, the first few complex values of the CIR already contain the desired environment information, and thus a truncated CIR (TCIR) can be reported as sensing measurement report (SMR), especially for use cases which are only interested in the time delay of the first arrival path.

As used herein, the term "channel capture feedback" is a general term for sending the channel capture (the stored channel estimate) to another device as feedback. SMR as defined in the IEEE 802.11bf specification is one format that channel capture feedback can take. Channel capture feedback involves sending the stored channel estimate; the receiver may then use the stored channel estimate to calculate a time of arrival (TOA), angle of arrival (AOA), or other sensing measurement.

In some use cases, channel capture need not store information for all of the different subcarriers (which may be referred to as "tones"), but may instead store a set of values, each value representing a group of 4, 8, or 16 subcarriers, in a process called "tone decimation." In the IEEE 802.11bf specification, for example, the variable Ng indicates the number of subcarriers in each group. Thus, for Ng=4, the number of values considered will be reduced by a factor of 4, and each value will represent the magnitude of the signals across the four subcarriers in the corresponding group. The IEEE 802.11bf standard supports different tone decimation modes for channel capture feedback. Under this standard, support for Ng=4 and Ng=8 are mandatory, while support for Ng=16 is optional (but very desirable for many sensing use cases). Increasing Ng lowers the overhead for channel capture transmission, but also shortens the maximum delay spread before aliasing may occur. For example, for 802.11bf frames, the following table shows subcarrier spacing and maximum delay spread for different tone decimations:

TABLE 1

| Maximum delay spread per value of Ng | | |
|---|---|---|
| Ng | Subcarrier spacing (kHz) | Max. delay spread (ns) |
| 4 | 312.5 | 3200 |
| 8 | 625.0 | 1600 |
| 16 | 1250.0 | 800 |

Figure 3:
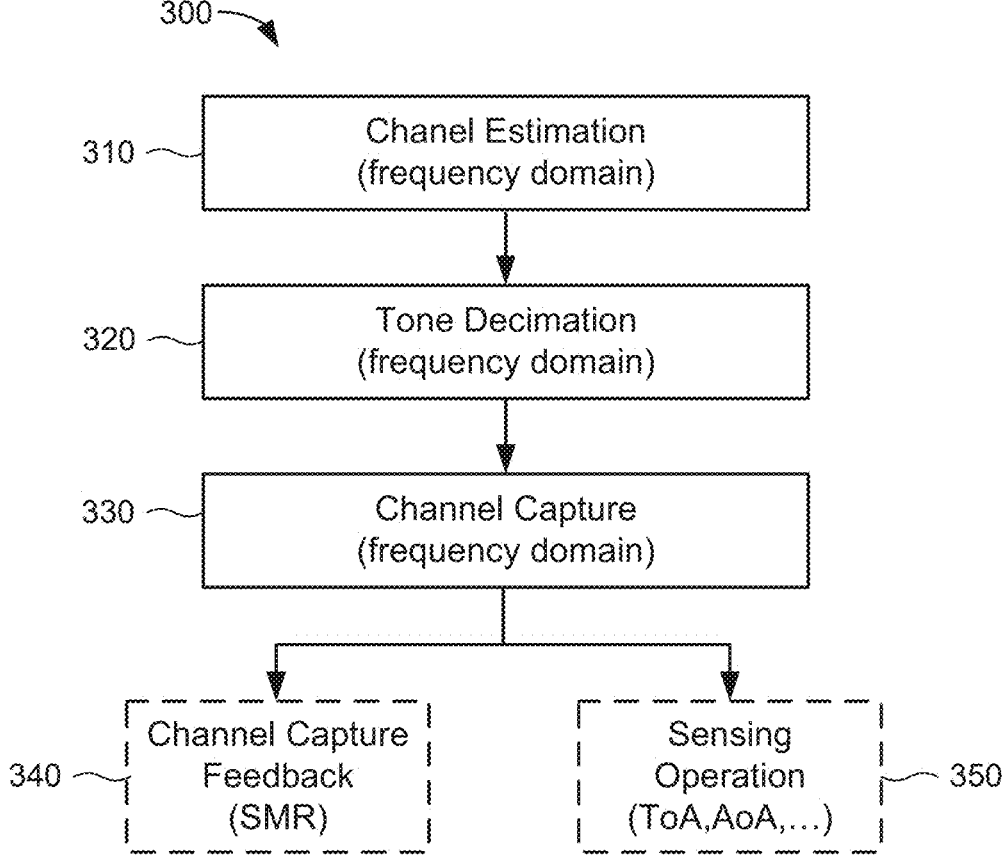
FIG. 3 is a flow chart illustrating a portion of a conventional process for performing channel capture.

FIG. 3 is a flow chart illustrating a portion of a conventional process 300 for performing channel capture, the results of which may be used to perform WLAN sensing. As shown in FIG. 3, the process 300 includes channel estimation (block 310), tone decimation (block 320), and channel capture (block 330), in which the channel estimate is stored for later use. In some aspects, the stored channel estimate may optionally be provided to another entity, e.g., as channel capture feedback (block 340). In 802.11bf networks, the channel capture feedback may be provided as an SMR. In some aspects, the stored channel estimate may optionally be used at a higher level within the same entity, e.g., as input into a sensing operation (block 350), which may indicate a TOA, AOA, etc., associated with a sensed object or sensing target.

Figure 4:
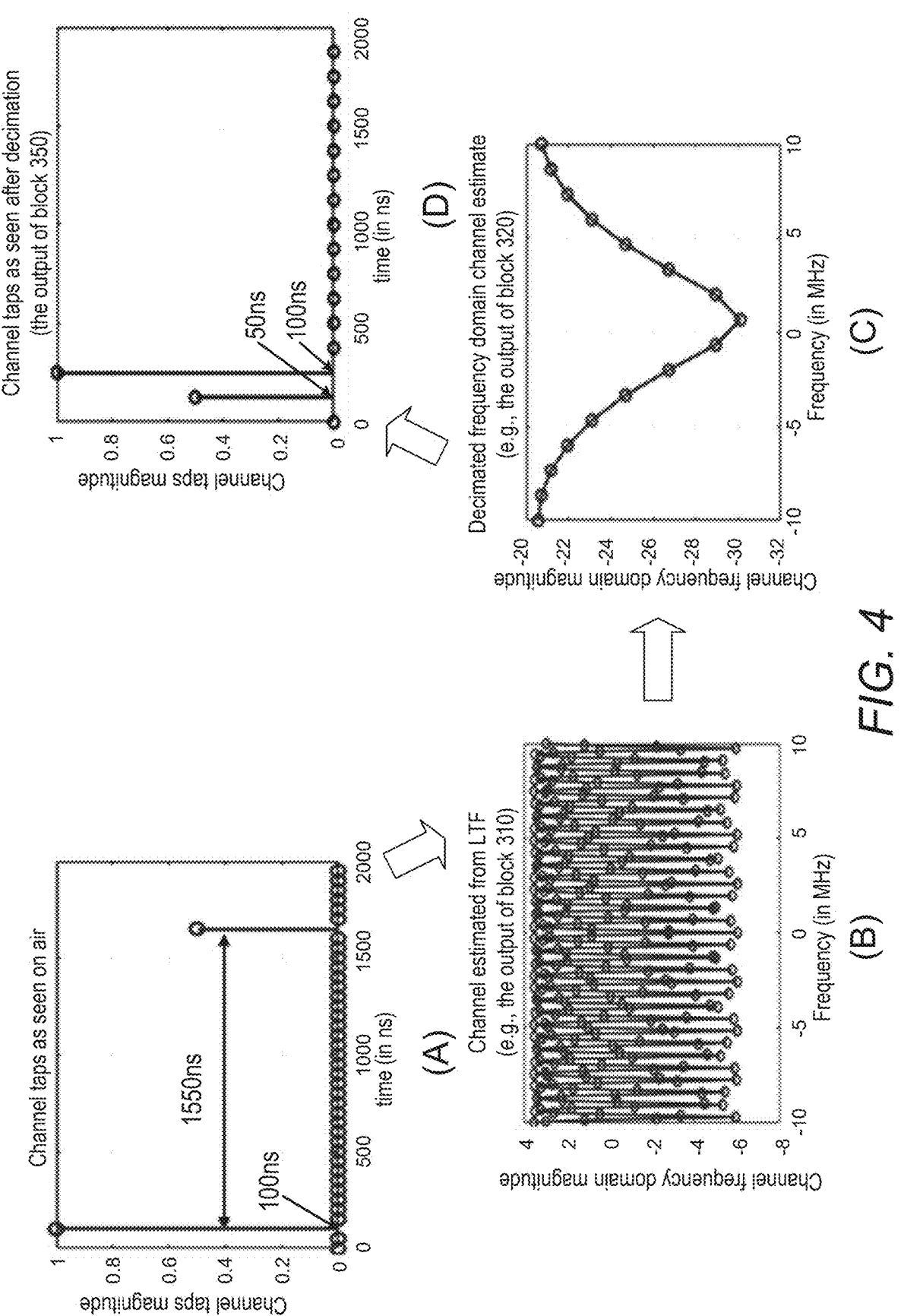
FIG. 4 illustrates example results at each of the steps shown in FIG. 3.

FIG. 4 illustrates example results at each of the steps shown in FIG. 3. FIG. 4 includes four graphs, which will be referred to herein as graphs 4(A) through 4(D). Graph 4(A) is a time domain graph showing example channel taps as seen on the air (i.e., representing the actual CIR of the channel). In the example shown in FIG. 4, graph 4(A) is a plot of the magnitudes of channel taps taken every 50 ns. In this example, as shown in graph 4(A), the receiver receives a line of sight (LOS) signal at time 100 ns and a non-LOS (NLOS) reflection at time 1650 ns. The term "delay spread" refers to the time between the earliest-arriving signal and the latest-arriving signal. In graph 4(A), the earliest-arriving signal arrives at 100 ns and the latest-arriving signal arrives at 1650 ns, for a delay spread of 1550 ns.

Graph 4(B) is a frequency domain graph showing example results of a channel estimation step, such as FIG. 3, block 310. In the example shown in FIG. 4, graph 4(B) is a plot of channel estimated magnitude in the frequency domain, which may be derived from a comparison of the received LTF and the expected LTF, received under the conditions shown in FIG. 4(A). Each point on the graph 4(B) represents an estimated magnitude at a particular subcarrier frequency, or "tone", having a subcarrier spacing of 78.124 kHz.

Graph 4(C) is a frequency domain graph showing an example result of a tone decimation step, such as FIG. 3, block 320. In the example shown in FIG. 4, graph 4(C) is a plot of channel estimated magnitude in the frequency domain for a tone decimation value of Ng=16, i.e., each point on graph 4(C) represents a magnitude of a group of 16 contiguous subcarriers. This data is stored during channel capture (block 330).

Graph 4(D) is a time domain graph showing apparent channel taps, representing a CIR derived from a CFR that was tone decimated, where the tone decimation caused aliasing. The information shown in graph 4(D) may be an input into a sensing operation (e.g., a TOA computation), such as FIG. 3, block 350. As can be seen in this example, however, the NLOS reflection at time 1650 ns in graph 4(A) occurs long after the maximum delay spread of 800 ns allowed for Ng=16. As a result, when the decimated frequency domain channel estimate illustrated in graph 4(C) is converted to a time domain channel tap plot as shown in graph 4(D), aliasing will cause the signal that arrived at 1650 ns to have an apparent arrival time of 50 ns (e.g., 1650 ns modulus 800 ns=50 ns).

Thus, due to aliasing caused during tone decimation, the later arriving signal at 1650 ns erroneously appears to be the first-arriving signal at 50 ns. A sensing or positioning calculation based on an assumption that the first arriving signal occurred at 50 ns (rather than at the actual arrival time at 100 ns) will therefore be incorrect by approximately 15 meters. Any channel with a larger delay spread than the maximum allowable delay spread for a given value of Ng can create sensing errors due to aliasing. For example, aliasing can cause errors in estimating a direct (LOS) path and each reflection (NLOS) path, negatively affecting the sensing applications that rely on separating different paths for sensing, such as per-path TOA estimation and per-path AOA estimation, for use cases like human identity identification, indoor mapping, etc.

To avoid this problem, techniques for aliasing removal before decimation are herein presented. To remove the impact of aliasing, an anti-aliasing filter step is performed after channel estimation and before tone decimation. In some aspects, the anti-aliasing filter may be implemented as a time-domain filter, a frequency-domain filter, or both. Removing aliasing before providing channel capture feedback can help provide correct channel estimation for up to the maximum delay spread supported, ensuring accurate TOA, AOA, and other per-path sensing metrics estimation in larger delay spread channels.

Figure 5:
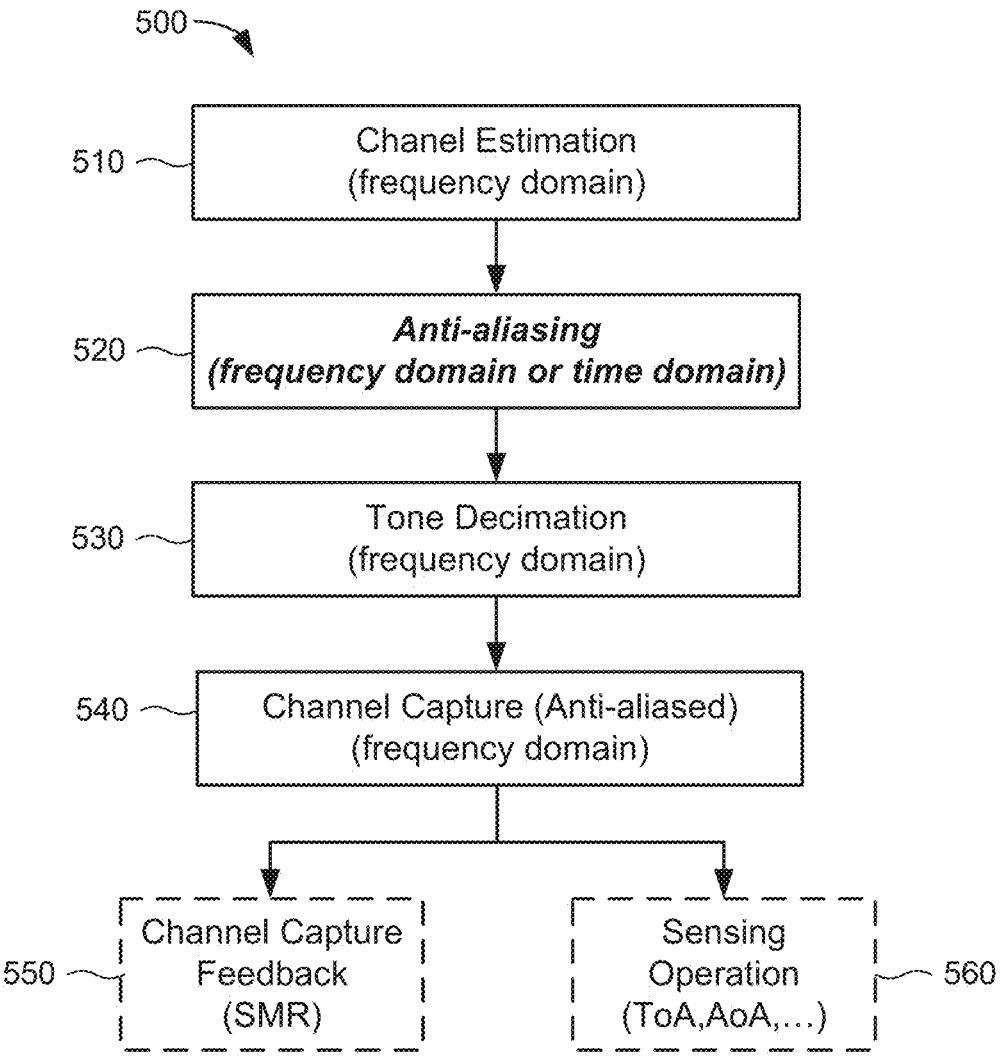
FIG. 5 is a flow chart illustrating a portion of a process for performing channel capture, according to aspects of the disclosure.

FIG. 5 is a flow chart illustrating a portion of a process 500 for performing channel capture, according to aspects of the disclosure. As shown in FIG. 5, the process 500 includes channel estimation (block 510), followed by an anti-aliasing operation (block 520) before tone decimation (block 530), so that the channel capture (block 540) is based on the anti-aliased channel estimation. As a result, the stored channel estimate will not have aliasing artifacts caused by tone decimation. In some aspects, the stored, anti-aliased channel estimate may optionally be provided to another entity, e.g., as channel capture feedback (block 550). In some aspects, the stored, anti-aliased channel estimate may optionally be used at a higher level within the same entity, e.g., as input into a sensing operation (block 560).

In some aspects, the anti-aliasing function is performed by an anti-aliasing filter (AAF) that removes all channel energy after the maximum delay spread for a given value of Ng.

For example, where Ng=16, the maximum tolerable delay spread is 800 ns; for that value of Ng, the AAF will remove all channel energy which arrives more than 800 ns after the first arrival path. In some aspects, the AAF behavior will change based on the current value of Ng. For example, the maximum tolerable delay spread may be calculated by the equation:

$$\text{maximum tolerable delay spread} = \text{MIN}\left(\text{guard interval}, \frac{\text{full } FFT \text{ size}}{BW * Ng}\right)$$

For example, for a guard interval of 1600 ns, a bandwidth (BW) of 20 MHz, a full FFT size of 256, and an Ng of 16, then $$\text{maximum tolerable delay spread} = \text{MIN}(1600 \text{ ns}, 800 \text{ ns}) = 800 \text{ ns}$$

Figure 6:
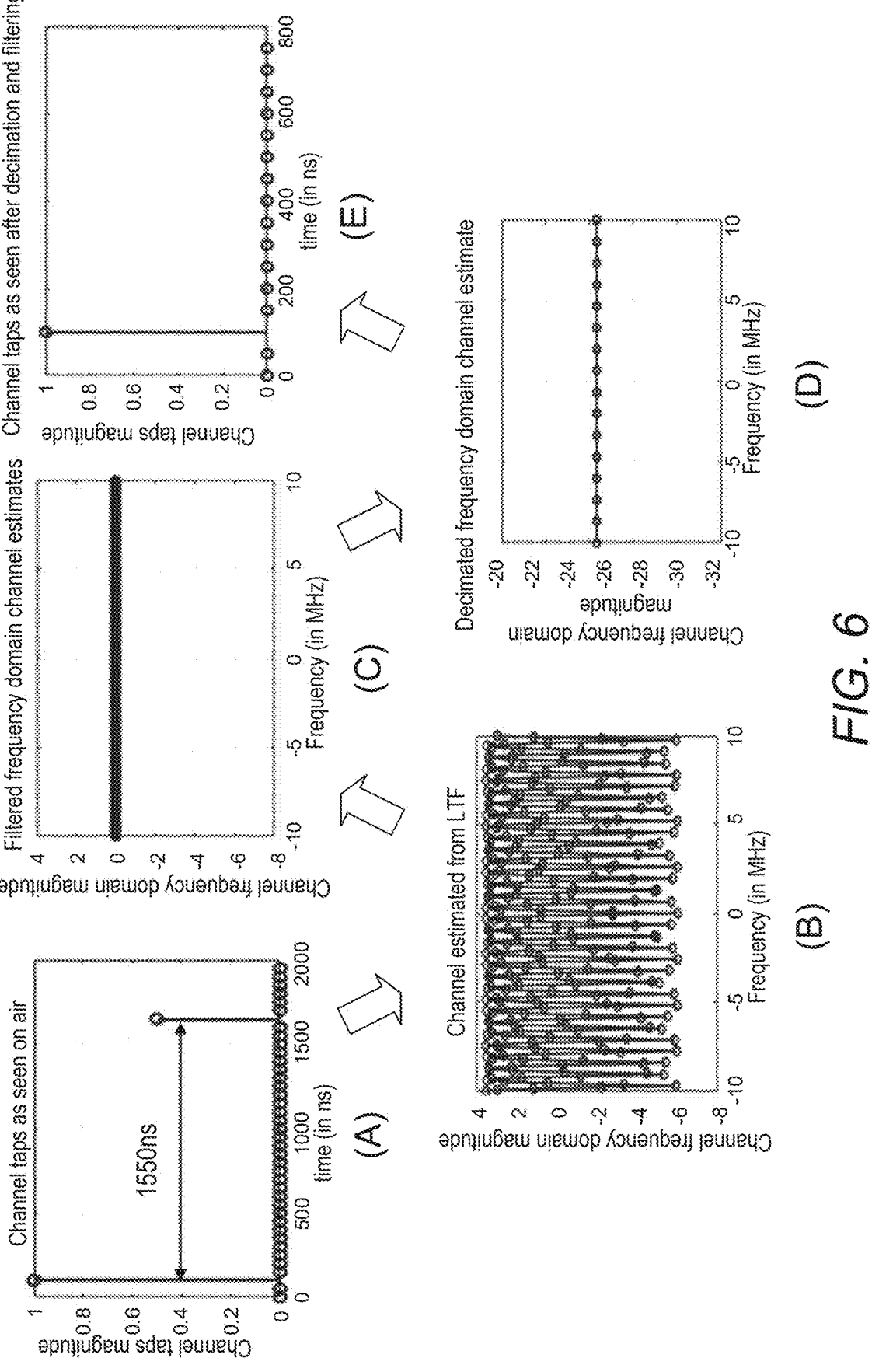
FIG. 6 illustrates the results of different steps of the process illustrated in FIG. 5.

FIG. 6 illustrates the results of different steps of the process illustrated in FIG. 5. FIG. 6 includes five graphs, which will be referred to herein as graphs 6(A) through 6(E).

Graph 6(A) shows actual channel taps as seen on air (i.e., representing the actual CIR of the channel), in which a LOS signal arrives at 100 ns and a NLOS signal arrives at 1650 ns.

Graph 6(B) shows the frequency domain channel estimated from LTF by the channel estimation (block 510).

Graph 6(C) shows the filtered (de-aliased) frequency domain channel estimations produced after anti-aliasing (block 520).

Graph 6(D) shows the decimated frequency domain channel estimates produced by tone decimation (block 530). This data is stored during the channel capture (block 540).

Graph 6(E) is a time domain graph showing apparent channel taps, representing a CIR derived from a CFR that was anti-aliased before tone decimation and as a result does not include any aliasing artifacts. The information shown in graph 6(E) may be input into a sensing operation (e.g., a TOA computation), such as FIG. 5, block 540. Because of the anti-aliasing (block 520), the graph 6(E) does not show the aliasing artifact at 50 ns that is shown in FIG. 4(D), and thus, the first arrival time will be correctly identified as 100 ns.

Figure 7:
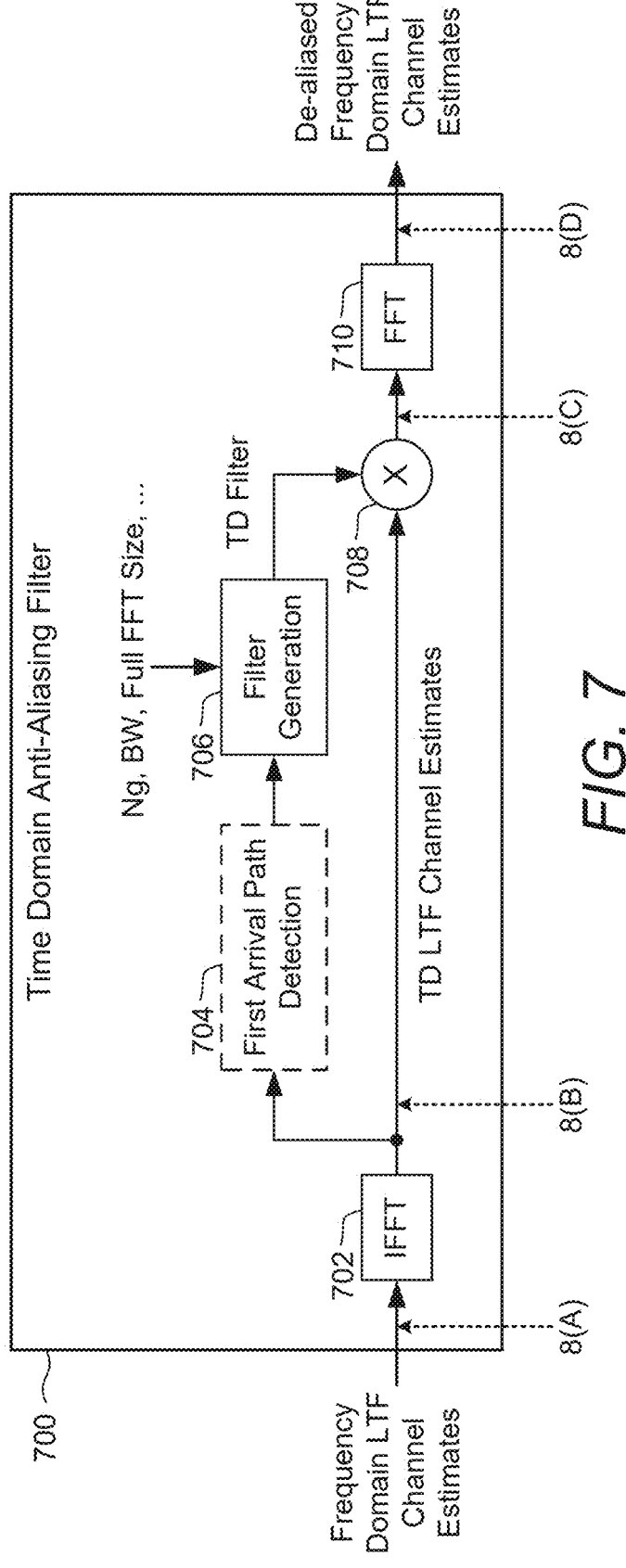
FIG. 7 is a block diagram illustrating an example time-domain anti-aliasing filter (TD-AAF), according to aspects of the disclosure.

FIG. 7 is a block diagram illustrating an example time-domain (TD) anti-aliasing filter (TD-AAF) 700, according to aspects of the disclosure. In the example shown in FIG. 7, the TD-AAF 700 includes an inverse fast Fourier transform (IFFT) module 702, an optional first arrival path detection module 704, a filter generation module 706, a multiplier 708, and a fast Fourier transform (FFT) module 710. The operation of the TD-AAF 700 will be explained in more detail with reference to FIG. 8.

Figure 8:
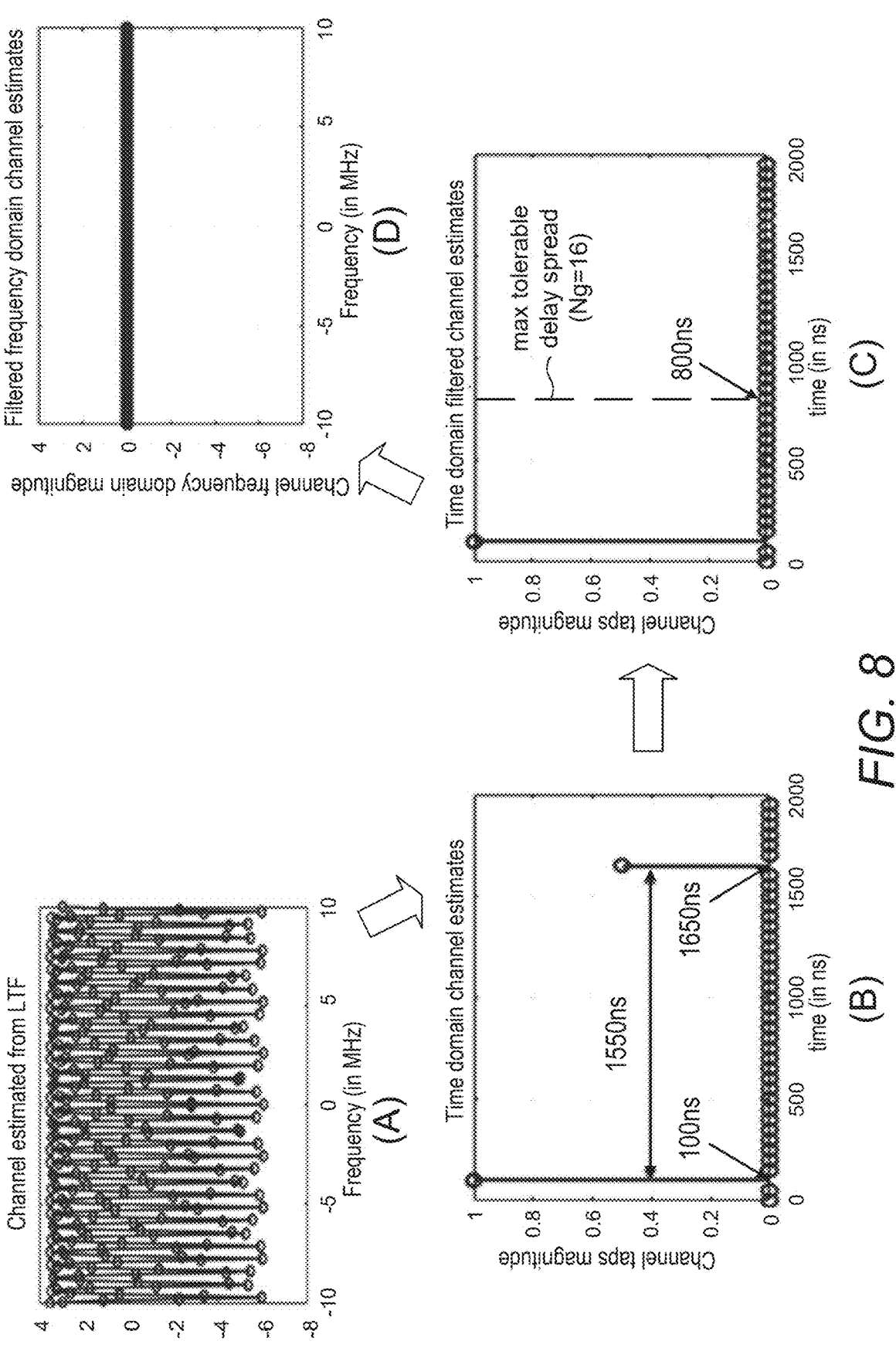
FIG. 8 illustrates example data that is input into or output from components within the TD-AAF of FIG. 7.

FIG. 8 illustrates example data that is input into or output from components within the TD-AAF 700. FIG. 8 includes four graphs, which will be referred to herein as graphs 8(A) through 8(D). In the example shown in FIG. 7, the IFFT module 702 receives frequency domain LTF channel estimates, such as shown in FIG. 8(A) e.g., from a frequency domain (FD) channel estimation module or process. The IFFT module 702 converts the FD channel estimates into TD channel estimates, such as shown in FIG. 8(B). Note that, because the IFFT module 702 uses the full (rather than tone-decimated) FD channel estimates, the TD channel estimates do not show any aliasing artifacts: the later-arriving signal correctly appears to have arrived at 1650 ns. In some aspects, the TD channel estimates are provided to the optional first arrival path detection module 704, which determines the start and end time of the TD filter, and to the filter generation module 706. In some aspects, the optional first arrival path detection module 704 may be omitted if timing synchronization is relatively accurate.

In some aspects, the start time of the TD filter may be calculated to be some amount of time, herein referred to as a protection time, before the time of arrival of the first detectable signal and the end time of the TD filter is the maximum tolerable delay spread after the start time. For example, for Ng=16, a protection time of 50 ns, and the TD channel estimates shown in FIG. 8(B), the start time of the TD filter may be 100 ns−50 ns=50 ns, and the end time of the TD filter may be 50 ns+800 ns=850 ns. In some aspects, such as when timing synchronization is relatively accurate, the start time of the TD filter may be calculated to be time 0 ns and the end time of the TD filter may be calculated to be the current maximum tolerable delay spread, e.g., 800 ns.

In the example shown in FIG. 7, the filter generation module 706 removes all channel energy which arrives more than the maximum tolerable delay spread after the first arrival path. In some aspects, the filter generation module 706 receives as control inputs or parameters values needed to calculate that maximum tolerable delay spread, e.g., the current value of Ng, the current bandwidth BW, the full FFT size, and the guard interval. In some aspects, the maximum tolerable delay spread parameter is provided as a direct parameter or input into the filter generation module 706.

In the example shown in FIG. 7, the outputs of the IFFT module 702 and the filter generation module 706 are multiplied together by the multiplier 708, to produce the TD-filtered channel estimates shown in FIG. 8(C). As seen in FIG. 8(C), because the later-arriving signal arrived after the maximum tolerable delay spread of 800 ns, the energy of that later arriving signal has been removed at the output of the multiplier 708.

The output of the multiplier 708 is provided to the FFT module 710, which converts the de-aliased channel estimates back to the frequency domain, resulting in the filtered FD channel estimates shown in FIG. 8(D). The de-aliased FD channel estimates are then tone decimated (e.g., FIG. 5, block 530) and may be used for a TD TOA computation (e.g., FIG. 5, block 540). Because the TD-AAF 700 removed the energy of signals having long delay paths from the FD channel estimates, the tone-decimated FD channel estimates will not produce aliased signals and therefore the first arrival path will be correctly identified (i.e., as having a first arrival time of 100 ns, in the example shown in FIG. 8).

It will be noted that the filter generation module 706 is designed to produce an output that removes the energy of any signals arriving after the maximum tolerable delay spread for the value of Ng currently being used. Thus, presuming that the other parameters (BW, full FFT size, etc., are the same), if Ng=8, then the filter generation module 706 will produce an output that, when multiplied with the output of the IFFT module 702, will remove the energy of any signals arriving after 1600 ns; if Ng=4, then the filter generation module 706 will produce an output that, when multiplied with the output of the IFFT module 702, will remove the energy of any signals arriving after 3200 ns, and so on.

Figure 9:
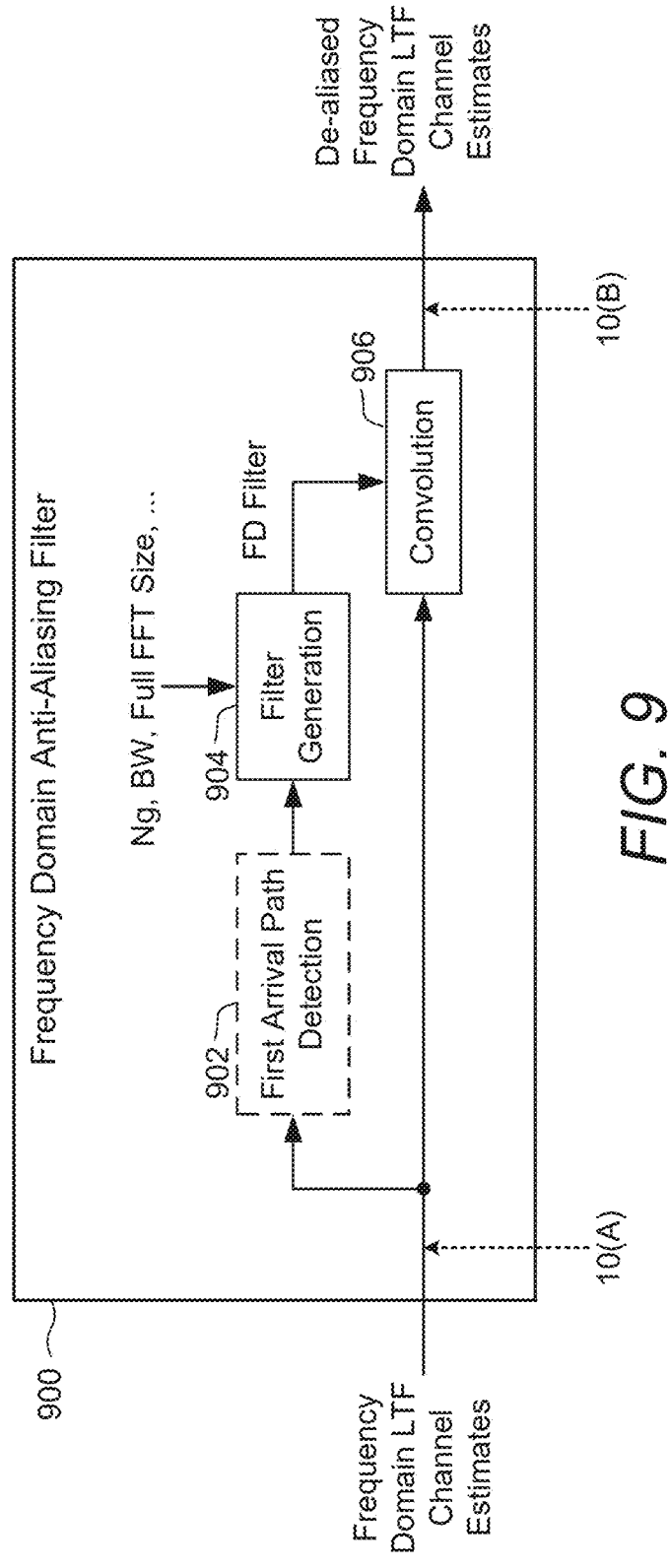
FIG. 9 is a block diagram illustrating an example frequency domain anti-aliasing filter (FD-AAF), according to aspects of the disclosure.

FIG. 9 is a block diagram illustrating an example frequency domain (FD) anti-aliasing filter (FD-AAF) 900, according to aspects of the disclosure. In the example shown in FIG. 9, the FD-AAF 900 includes an optional first arrival path detection module 902, a filter generation module 904, and a convolution module 906. The operation of the FD-AAF 900 will be explained in more detail with reference to FIG. 10.

Figure 10:
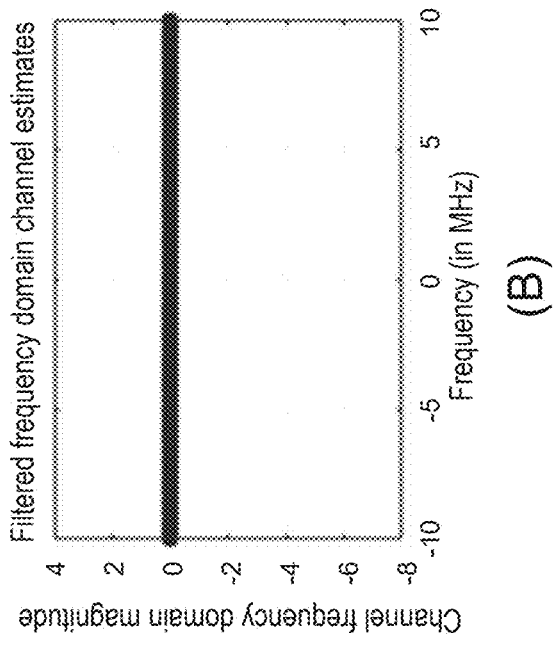
FIG. 10 illustrates example data that is input into or output from components within the FD-AAF of FIG. 9.
Figure 10:
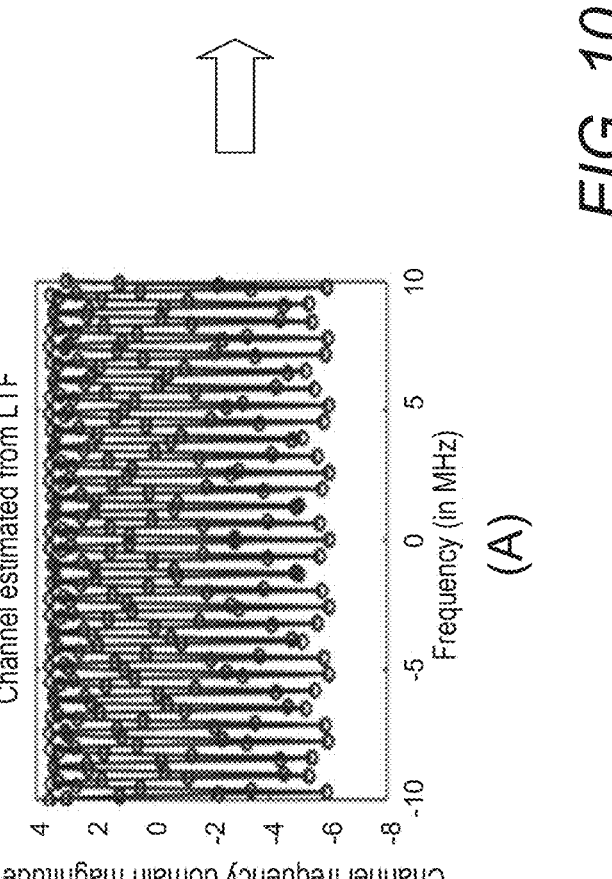

FIG. 10 illustrates example data that is input into or output from components within the FD-AAF 900. FIG. 10 includes two graphs, which will be referred to herein as graphs 10(A) and 10(B). In the example shown in FIG. 9, the optional first arrival path detection module 902 receives frequency domain LTF channel estimates, such as shown in FIG. 10(A), e.g., from a frequency domain (FD) channel estimation module or process. The optional first arrival path detection module 902 determines the first arrival path, which is provided to the filter generation module 904 along with information needed to calculate the maximum tolerable delay spread (or the maximum tolerable delay spread itself), which the filter generation module 904 uses to generate a frequency domain anti-aliasing filter. In some aspects, first arrival path estimation may comprise estimating the phase slope of the frequency domain channel estimates and using the phase slope to derive the first arrival time. In some aspects, the optional first arrival path detection module 902 may be omitted if timing synchronization is relatively accurate.

As shown in FIG. 9, the output of the filter generation module 904 and the FD channel estimates are provided as inputs into the convolution module 906, which convolves the FD channel estimates with the generated filter to get filtered (de-aliased) frequency domain channel estimates, as shown in FIG. 10(B). In the example shown in FIG. 9, the filter generation module 904 removes, from the frequency domain channel estimates, all channel energy which arrives more than the maximum tolerable delay spread after the first arrival path in the time domain. The de-aliased FD channel estimates are then tone decimated (e.g., FIG. 5, block 530) and may be used for a TD TOA computation (e.g., FIG. 5, block 540). Because the FD-AAF 900 removed the energy of signals having long delay paths from the FD channel estimates, the tone-decimated FD channel estimates will not produce aliased signals and therefore the first arrival path will be correctly identified.

It will be noted that the filter generation module 904 is designed to produce an output that removes the energy of any signals arriving after the maximum tolerable delay spread for the value of Ng currently being used. Thus, presuming that the other parameters (BW, full FFT size, etc., are the same), if Ng=8, then the filter generation module 904 will produce an output that, when convoluted with the FD channel estimates, will remove the energy of any signals arriving after 1600 ns; if Ng=4, then the filter generation module 904 will produce an output that, when convoluted with the FD channel estimates, will remove the energy of any signals arriving after 3200 ns, and so on.

While the techniques above are described in the context of an 802.11bf compliant device, the same techniques may be applied to benefit any Wi-Fi channel capture with frequency domain tone sampling such that:

$$\Delta f > \frac{1}{\text{guard interval } (GI)}$$

FIG. 11 is a flowchart of an example process 1100 associated with aliasing removal for 802.11bf channel captures, according to aspects of the disclosure. In some implementations, one or more process blocks of FIG. 11 may be performed by a WLAN station (e.g., UE 104, STA 152, STA 200, etc.). In some implementations, one or more process blocks of FIG. 11 may be performed by another device or a group of devices separate from or including the STA. Additionally, or alternatively, one or more process blocks of FIG. 11 may be performed by one or more components of STA 200, such as processor(s) 242, memory 240, WWAN transceiver(s) 210, WLAN wireless transceiver(s) 220, satellite signal receiver 230, sensor(s) 244, user interface 246, and channel estimation module(s) 248, any or all of which may be means for performing the operations of process 1100.

As shown in FIG. 11, process 1100 may include, at block 1110, estimating a wireless channel to produce a first frequency domain (FD) channel estimate. Means for performing the operation of block 1110 may include the processor(s) 242, memory 240, or WLAN transceiver(s) 220 of the STA 200. For example, the STA 200 may estimate a wireless channel to produce a first frequency domain (FD) channel estimate, using the receiver(s) 222, the transmitter(s) 224, and the processor(s) 242.

As further shown in FIG. 11, process 1100 may include, at block 1120, anti-aliasing the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread. Means for performing the operation of block 1120 may include the processor(s) 242, memory 240, or WLAN transceiver(s) 220 of the STA 200. For example, the STA 200 may de-alias the first FD channel estimate to produce a second FD channel estimate, using the processor(s) 242 and the memory 240.

As further shown in FIG. 11, process 1100 may include, at block 1130, tone-decimating the second FD channel estimate to produce a third FD channel estimate. Means for performing the operation of block 1130 may include the processor(s) 242, memory 240, or WLAN transceiver(s) 220 of the STA 200. For example, the STA 200 may tone-decimate the second FD channel estimate to produce the third FD channel estimate using the processor(s) 242 and the memory 240.

As further shown in FIG. 11, process 1100 may include, at block 1140, storing the third FD channel estimate as a channel capture. Means for performing the operation of block 1140 may include the processor(s) 242, memory 240, or WLAN transceiver(s) 220 of the STA 200. For example, the STA 200 may store the third FD channel estimate into the memory 240.

In some aspects, process 1100 includes at least one of providing the third FD channel estimate as channel capture feedback, or performing a sensing operation based on the third FD channel estimate.

In some aspects, performing the sensing operation based on the third FD channel estimate comprises at least one of computing a TD channel estimate, computing a CIR, computing a TOA of a signal, or computing an AOA of a signal.

In some aspects, anti-aliasing the first FD channel estimate to produce the second FD channel estimate comprises performing the anti-aliasing in a time domain.

In some aspects, performing the anti-aliasing in the time domain comprises generating a first TD channel estimate based on the first FD channel estimate, generating a TD filter based on at least the first TD channel estimate, multiplying the first TD channel estimate with the TD filter to produce a second TD channel estimate, and generating a second FD channel estimate based on the second TD channel estimate.

In some aspects, generating the first TD channel estimate based on the first FD channel estimate comprises performing an IFFT on the first FD channel estimate to produce the first TD estimate.

In some aspects, generating the TD filter based on at least the first TD channel estimate comprises detecting, based on the first TD channel estimate, an arrival time of a first arrival path in the time domain, and generating the TD filter based at least in part on the arrival time of the first arrival path.

In some aspects, generating the TD filter based on at least the first TD channel estimate comprises determining a maximum tolerable delay spread, and generating the TD filter based at least in part on the maximum tolerable delay spread.

In some aspects, generating the second FD channel estimate based on the second TD channel estimate comprises performing an FFT on the second TD channel estimate to produce the second FD estimate.

In some aspects, anti-aliasing the first FD channel estimate to produce the second FD channel estimate comprises performing the anti-aliasing in the frequency domain.

In some aspects, performing the anti-aliasing in the frequency domain comprises generating a FD filter based on at least the first FD channel estimate, and convoluting the first FD channel estimate with the FD filter to produce the second FD channel estimate.

In some aspects, generating the FD filter based on at least the first FD channel estimate comprises detecting, based on the first FD channel estimate, an arrival time of a first arrival path in a time domain, and generating the FD filter based at least in part on the arrival time of the first arrival path in the time domain.

In some aspects, generating the FD filter based on at least the first FD channel estimate comprises determining a maximum tolerable delay spread, and generating the FD filter based at least in part on the maximum tolerable delay spread.

Process 1100 may include additional implementations, such as any single implementation or any combination of implementations described below and/or in connection with one or more other processes described elsewhere herein. Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless sensing, the method comprising: estimating a wireless channel to produce a first frequency domain (FD) channel estimate; anti-aliasing the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread; tone-decimating the second FD channel estimate to produce a third FD channel estimate; and storing the third FD channel estimate as a channel capture.

Clause 2. The method of clause 1, further comprising at least one of: providing the third FD channel estimate as channel capture feedback; or performing a sensing operation based on the third FD channel estimate.

Clause 3. The method of clause 2, wherein performing the sensing operation based on the third FD channel estimate comprises at least one of: computing a time domain (TD) channel estimate; computing a channel impulse response (CIR); computing a time of arrival (TOA) of a signal; or computing an angle of arrival (AOA) of a signal.

Clause 4. The method of any of clauses 1 to 3, wherein anti-aliasing the first FD channel estimate to produce the second FD channel estimate comprises performing the anti-aliasing in a time domain.

Clause 5. The method of clause 4, wherein performing the anti-aliasing in the time domain comprises: generating a first time domain (TD) channel estimate based on the first FD channel estimate; generating a TD filter based on at least the first TD channel estimate; multiplying the first TD channel estimate with the TD filter to produce a second TD channel estimate; and generating a second FD channel estimate based on the second TD channel estimate.

Clause 6. The method of clause 5, wherein generating the first FD channel estimate based on the first time TD channel estimate comprises performing an inverse fast Fourier transform (IFFT) on the first FD channel estimate to produce the first TD estimate.

Clause 7. The method of any of clauses 5 to 6, wherein generating the TD filter based on at least the first TD channel estimate comprises: detecting, based on the first TD channel estimate, an arrival time of a first arrival path in the time domain; and generating the TD filter based at least in part on the arrival time of the first arrival path.

Clause 8. The method of any of clauses 5 to 7, wherein generating the TD filter based on at least the first TD channel estimate comprises: determining a maximum tolerable delay spread; and generating the TD filter based at least in part on the maximum tolerable delay spread.

Clause 9. The method of any of clauses 5 to 8, wherein generating the second FD channel estimate based on the second TD channel estimate comprises performing a fast Fourier transform (FFT) on the second TD channel estimate to produce the second FD estimate.

Clause 10. The method of any of clauses 1 to 9, wherein anti-aliasing the first FD channel estimate to produce the second FD channel estimate comprises performing the anti-aliasing in the frequency domain.

Clause 11. The method of clause 10, wherein performing the anti-aliasing in the frequency domain comprises: generating a FD filter based on at least the first FD channel estimate; and convoluting the first FD channel estimate with the FD filter to produce the second FD channel estimate.

Clause 12. The method of clause 11, wherein generating the FD filter based on at least the first FD channel estimate comprises: detecting, based on the first FD channel estimate, an arrival time of a first arrival path in a time domain; and generating the FD filter based at least in part on the arrival time of the first arrival path in the time domain.

Clause 13. The method of any of clauses 11 to 12, wherein generating the FD filter based on at least the first FD channel estimate comprises: determining a maximum tolerable delay spread; and generating the FD filter based at least in part on the maximum tolerable delay spread.

Clause 14. A wireless station (STA), comprising: one or more memories; one or more transceivers; and one or more processors communicatively coupled to the one or more memories and the one or more transceivers, the one or more processors, either alone or in combination, configured to: estimate a wireless channel to produce a first frequency domain (FD) channel estimate; anti-alias the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread; tone-decimate the second FD channel estimate to produce a third FD channel estimate; and store the third FD channel estimate as a channel capture.

Clause 15. The STA of clause 14, wherein the one or more processors, either alone or in combination, are further configured to at least one of: provide the third FD channel estimate as channel capture feedback; or perform a sensing operation based on the third FD channel estimate.

Clause 16. The STA of clause 15, wherein, to perform the sensing operation based on the third FD channel estimate, the one or more processors, either alone or in combination, are configured to: compute a time domain (TD) channel estimate; compute a channel impulse response (CIR); compute a time of arrival (TOA) of a signal; or compute an angle of arrival (AOA) of a signal.

Clause 17. The STA of any of clauses 14 to 16, wherein, to anti-alias the first FD channel estimate to produce the second FD channel estimate, the one or more processors, either alone or in combination, are configured to perform the anti-aliasing in a time domain.

Clause 18. The STA of clause 17, wherein, to perform the anti-aliasing in the time domain, the one or more processors, either alone or in combination, are configured to: generate a first time domain (TD) channel estimate based on the first FD channel estimate; generate a TD filter based on at least the first TD channel estimate; multiply the first TD channel estimate with the TD filter to produce a second TD channel estimate; and generate a second FD channel estimate based on the second TD channel estimate.

Clause 19. The STA of clause 18, wherein, to generate the first FD channel estimate based on the first time TD channel estimate, the one or more processors, either alone or in combination, are configured to perform an inverse fast Fourier transform (IFFT) on the first FD channel estimate to produce the first TD estimate.

Clause 20. The STA of any of clauses 18 to 19, wherein, to generate the TD filter based on at least the first TD channel estimate, the one or more processors, either alone or in combination, are configured to: detect, based on the first TD channel estimate, an arrival time of a first arrival path in the time domain; and generate the TD filter based at least in part on the arrival time of the first arrival path.

Clause 21. The STA of any of clauses 18 to 20, wherein, to generate the TD filter based on at least the first TD channel estimate, the one or more processors, either alone or in combination, are configured to: determine a maximum tolerable delay spread; and generate the TD filter based at least in part on the maximum tolerable delay spread.

Clause 22. The STA of any of clauses 18 to 21, wherein, to generate the second FD channel estimate based on the second TD channel estimate, the one or more processors, either alone or in combination, are configured to perform a fast Fourier transform (FFT) on the second TD channel estimate to produce the second FD estimate.

Clause 23. The STA of any of clauses 14 to 22, wherein, to anti-alias the first FD channel estimate to produce the second FD channel estimate, the one or more processors, either alone or in combination, are configure to perform the anti-aliasing in the frequency domain.

Clause 24. The STA of clause 23, wherein, to perform the anti-aliasing in the frequency domain, the one or more processors, either alone or in combination, are configured to: generate a FD filter based on at least the first FD channel estimate; and convolute the first FD channel estimate with the FD filter to produce the second FD channel estimate.

Clause 25. The STA of clause 24, wherein, to generate the FD filter based on at least the first FD channel estimate, the one or more processors, either alone or in combination, are configured to: detect, based on the first FD channel estimate, an arrival time of a first arrival path in a time domain; and generate the FD filter based at least in part on the arrival time of the first arrival path in the time domain.

Clause 26. The STA of any of clauses 24 to 25, wherein, to generate the FD filter based on at least the first FD channel estimate, the one or more processors, either alone or in combination, are configured to: determine a maximum tolerable delay spread; and generate the FD filter based at least in part on the maximum tolerable delay spread.

Clause 27. An apparatus comprising a memory, a transceiver, and a processor communicatively coupled to the memory and the transceiver, the memory, the transceiver, and the processor configured to perform a method according to any of clauses 1 to 13.

Clause 28. An apparatus comprising means for performing a method according to any of clauses 1 to 13.

Clause 29. A non-transitory computer-readable medium storing computer-executable instructions, the computer-executable comprising at least one instruction for causing a computer or processor to perform a method according to any of clauses 1 to 13.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., STA). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of wireless sensing, the method comprising:
estimating a wireless channel to produce a first frequency domain (FD) channel estimate;
anti-aliasing the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread;
tone-decimating the second FD channel estimate to produce a third FD channel estimate; and
storing the third FD channel estimate as a channel capture.

2. The method of claim 1, further comprising at least one of:
providing the third FD channel estimate as channel capture feedback; or
performing a sensing operation based on the third FD channel estimate.

3. The method of claim 2, wherein performing the sensing operation based on the third FD channel estimate comprises at least one of:
computing a time domain (TD) channel estimate;
computing a channel impulse response (CIR);
computing a time of arrival (TOA) of a signal; or
computing an angle of arrival (AOA) of a signal.

4. The method of claim 1, wherein anti-aliasing the first FD channel estimate to produce the second FD channel estimate comprises performing the anti-aliasing in a time domain.

5. The method of claim 4, wherein performing the anti-aliasing in the time domain comprises:
generating a first time domain (TD) channel estimate based on the first FD channel estimate;
generating a TD filter based on at least the first TD channel estimate;
multiplying the first TD channel estimate with the TD filter to produce a second TD channel estimate; and
generating a second FD channel estimate based on the second TD channel estimate.

6. The method of claim 5, wherein generating the first TD channel estimate based on the first FD channel estimate comprises performing an inverse fast Fourier transform (IFFT) on the first FD channel estimate to produce the first TD estimate.

7. The method of claim 5, wherein generating the TD filter based on at least the first TD channel estimate comprises:
detecting, based on the first TD channel estimate, an arrival time of a first arrival path in the time domain; and generating the TD filter based at least in part on the arrival time of the first arrival path.

8. The method of claim 5, wherein generating the TD filter based on at least the first TD channel estimate comprises:

determining a maximum tolerable delay spread; and generating the TD filter based at least in part on the maximum tolerable delay spread.

9. The method of claim 5, wherein generating the second FD channel estimate based on the second TD channel estimate comprises performing a fast Fourier transform (FFT) on the second TD channel estimate to produce the second FD estimate.

10. The method of claim 1, wherein anti-aliasing the first FD channel estimate to produce the second FD channel estimate comprises performing the anti-aliasing in the frequency domain.

11. The method of claim 10, wherein performing the anti-aliasing in the frequency domain comprises:

generating a FD filter based on at least the first FD channel estimate; and convoluting the first FD channel estimate with the FD filter to produce the second FD channel estimate.

12. The method of claim 11, wherein generating the FD filter based on at least the first FD channel estimate comprises:

detecting, based on the first FD channel estimate, an arrival time of a first arrival path in a time domain; and generating the FD filter based at least in part on the arrival time of the first arrival path in the time domain.

13. The method of claim 11, wherein generating the FD filter based on at least the first FD channel estimate comprises:

determining a maximum tolerable delay spread; and generating the FD filter based at least in part on the maximum tolerable delay spread.

14. A wireless station (STA), comprising:

one or more memories;

one or more transceivers; and one or more processors communicatively coupled to the one or more memories and the one or more transceivers, the one or more processors, either alone or in combination, configured to:

estimate a wireless channel to produce a first frequency domain (FD) channel estimate;

anti-alias the first FD channel estimate to produce a second FD channel estimate, wherein anti-aliasing the first FD channel estimate to produce a second FD channel estimate comprises removing, from the first FD channel estimate, signal energy associated with signals having a delay spread larger than a maximum tolerable delay spread;

tone-decimate the second FD channel estimate to produce a third FD channel estimate; and store the third FD channel estimate as a channel capture.

15. The STA of claim 14, wherein the one or more processors, either alone or in combination, are further configured to at least one of:

provide the third FD channel estimate as channel capture feedback; or perform a sensing operation based on the third FD channel estimate.

16. The STA of claim 15, wherein, to perform the sensing operation based on the third FD channel estimate, the one or more processors, either alone or in combination, are configured to:

compute a time domain (TD) channel estimate;

compute a channel impulse response (CIR);

compute a time of arrival (TOA) of a signal; or compute an angle of arrival (AOA) of a signal.

17. The STA of claim 14, wherein, to anti-alias the first FD channel estimate to produce the second FD channel estimate, the one or more processors, either alone or in combination, are configured to perform the anti-aliasing in a time domain.

18. The STA of claim 17, wherein, to perform the anti-aliasing in the time domain, the one or more processors, either alone or in combination, are configured to:

generate a first time domain (TD) channel estimate based on the first FD channel estimate;

generate a TD filter based on at least the first TD channel estimate;

multiply the first TD channel estimate with the TD filter to produce a second TD channel estimate; and generate a second FD channel estimate based on the second TD channel estimate.

19. The STA of claim 14, wherein, to anti-alias the first FD channel estimate to produce the second FD channel estimate, the one or more processors, either alone or in combination, are configure to perform the anti-aliasing in the frequency domain.

20. The STA of claim 19, wherein, to perform the anti-aliasing in the frequency domain, the one or more processors, either alone or in combination, are configured to:

generate a FD filter based on at least the first FD channel estimate; and convolute the first FD channel estimate with the FD filter to produce the second FD channel estimate.

* * * * *